(12) United States Patent
Onishi et al.

(10) Patent No.: US 6,909,282 B2
(45) Date of Patent: Jun. 21, 2005

(54) ROTATION ANGLE DETECTOR

(75) Inventors: Masahide Onishi, Fukui (JP);
Toshihiro Nomura, Fukui (JP); Ichiro Tateishi, Fukui (JP); Hisashi Nishikawa, Shiga (JP); Yoshiyuki Nakade, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/697,387

(22) Filed: Oct. 30, 2003

(65) Prior Publication Data

US 2004/0145364 A1 Jul. 29, 2004

(30) Foreign Application Priority Data

Dec. 4, 2002 (JP) ........................................ 2002-352392

(51) Int. Cl.[7] ................................................. G01B 7/30

(52) U.S. Cl. .............................. 324/207.25; 324/207.23

(58) Field of Search ....................... 324/207.23, 207.11, 324/207.13, 207.14, 207.2, 207.22, 207.21, 207.25; 123/612, 617; 73/DIG. 2–3

(56) References Cited

FOREIGN PATENT DOCUMENTS

JP          2002-206910 A          7/2002

*Primary Examiner*—Bot LeDynh
(74) *Attorney, Agent, or Firm*—RatnerPrestia

(57) ABSTRACT

A rotation angle detector includes a rotor, first and second detecting elements which rotate according to a rotation of the rotor, first and second detecting units for detecting rotations of the first and second detecting elements, respectively, and a control unit for detecting a rotation angle of the rotor based on a first signal when a difference between the first and second signals output from the first and second detecting units ranges within a predetermined range. The rotation angle detector has a simple structure and detects the rotation angle of the rotor accurately

9 Claims, 10 Drawing Sheets

ROTATION ANGLE DETECTOR

FIELD OF THE INVENTION

The present invention relates to a rotation angle detector for detecting a rotation angle of a rotor, such as a steering wheel of a vehicle.

BACKGROUND OF THE INVENTION

Vehicles recently having advanced functions include various rotation angle detectors detects steering wheels of the vehicles for executing various controlling.

FIG. 11 is a perspective view of an essential part of a conventional rotation angle detector. Spur gear 1A is provided on a rim of rotor 1, and fitting part 1B for fitting to a shaft of a steering wheel (not shown) passing through rotor 1 is provided inside rotor 1. Spur gear 2A on a rim of detecting element 2 engages with spur gear 1A of rotor 1, and magnet 3 is mounted at the center of detecting element 2 preferably by insert molding. Wiring board 4 is provided on a top face of detecting element 2 substantially in parallel to detecting element 2. Wiring board 4 has wiring patterns (not illustrated) formed on both faces thereof. Magnetic sensor 5 mounted on wiring board 4 faces magnet 3 of detecting element 2. Magnet 3 and magnetic sensor 5 facing each other composes detecting unit 6. Control unit 7 connected to magnetic sensor 5 is provided on wiring board 4 preferably as a microcomputer. The control unit is connected to an electronic circuit (not illustrated) in the vehicle with a connector (not illustrated), thus providing a rotation angle detector.

When the steering wheel rotates, rotor 1 rotates, and accordingly, detecting element 2 including spur gear 2A engaged to spur gear 1A on the rim of rotor 1 rotates. According to the rotation of detecting element 2, a magnetic field from magnet 3 mounted at the center of detecting element 2 changes. Magnetic sensor 5 detects the magnetic intensity, and outputs a detection signal having a substantially triangular waveform to control unit 7. Then, control unit 7 detects the rotation angle of rotor 1 based on the number of peaks of the waveform and a level of the detection signal received from magnetic sensor 5.

In the conventional detector, the rotation angle of rotor 1 is detected by single detecting element 2 engaged to rotor 1. This arrangement causes the detector not to detect the rotation angle accurately if detecting element 2 detaches from rotor 1 or if spur gear 2A is damaged or worn.

Japanese Patent Laid-Open Publication No.2002-206910 discloses another conventional rotation angle detector.

SUMMARY OF THE INVENTION

A rotation angle detector includes a rotor, first and second detecting elements which rotate according to a rotation of the rotor, first and second detecting units for detecting rotations of the first and second detecting elements, respectively, and a control unit for detecting a rotation angle of the rotor based on a first signal when a difference between the first and second signals output from the first and second detecting units ranges within a predetermined range.

The rotation angle detector has a simple structure and detects the rotation angle of the rotor accurately

DETAILED DESCRIPTION OF THE PREFERRED EMBODIMENTS (Exemplary Embodiment 1)

Figure 1:
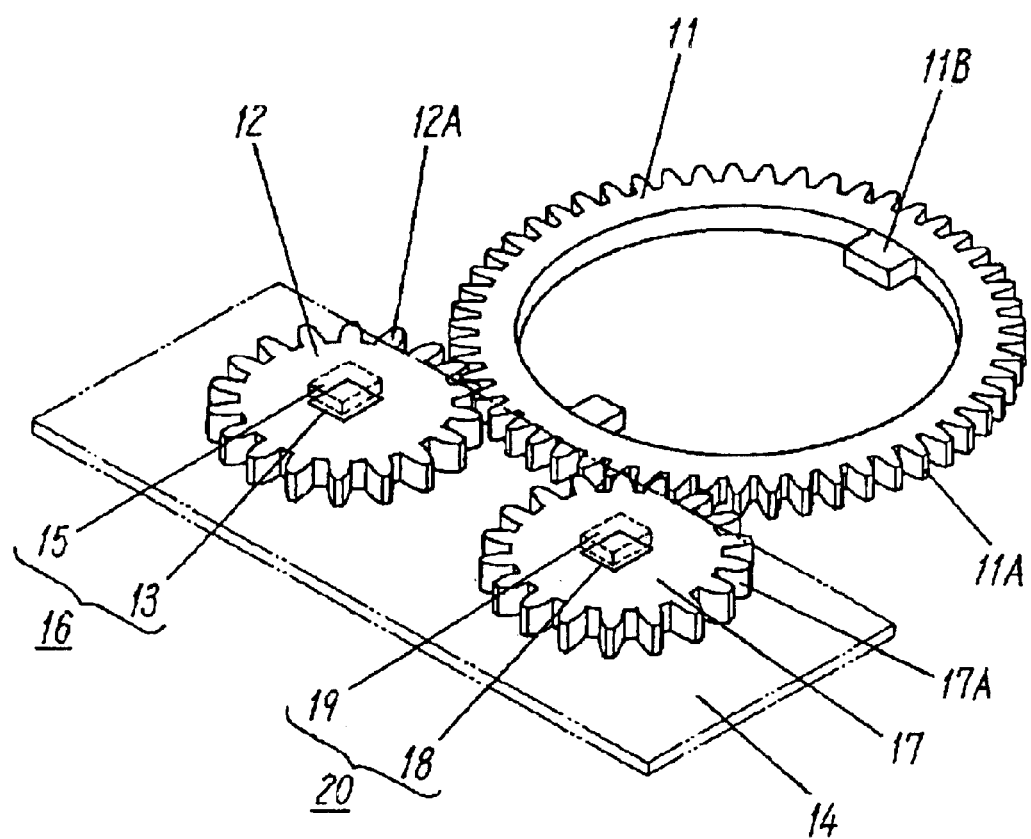
FIG. 1 is a perspective view of an essential part of a rotation angle detector in accordance with Exemplary Embodiment 1 of the present invention.
Figure 2:
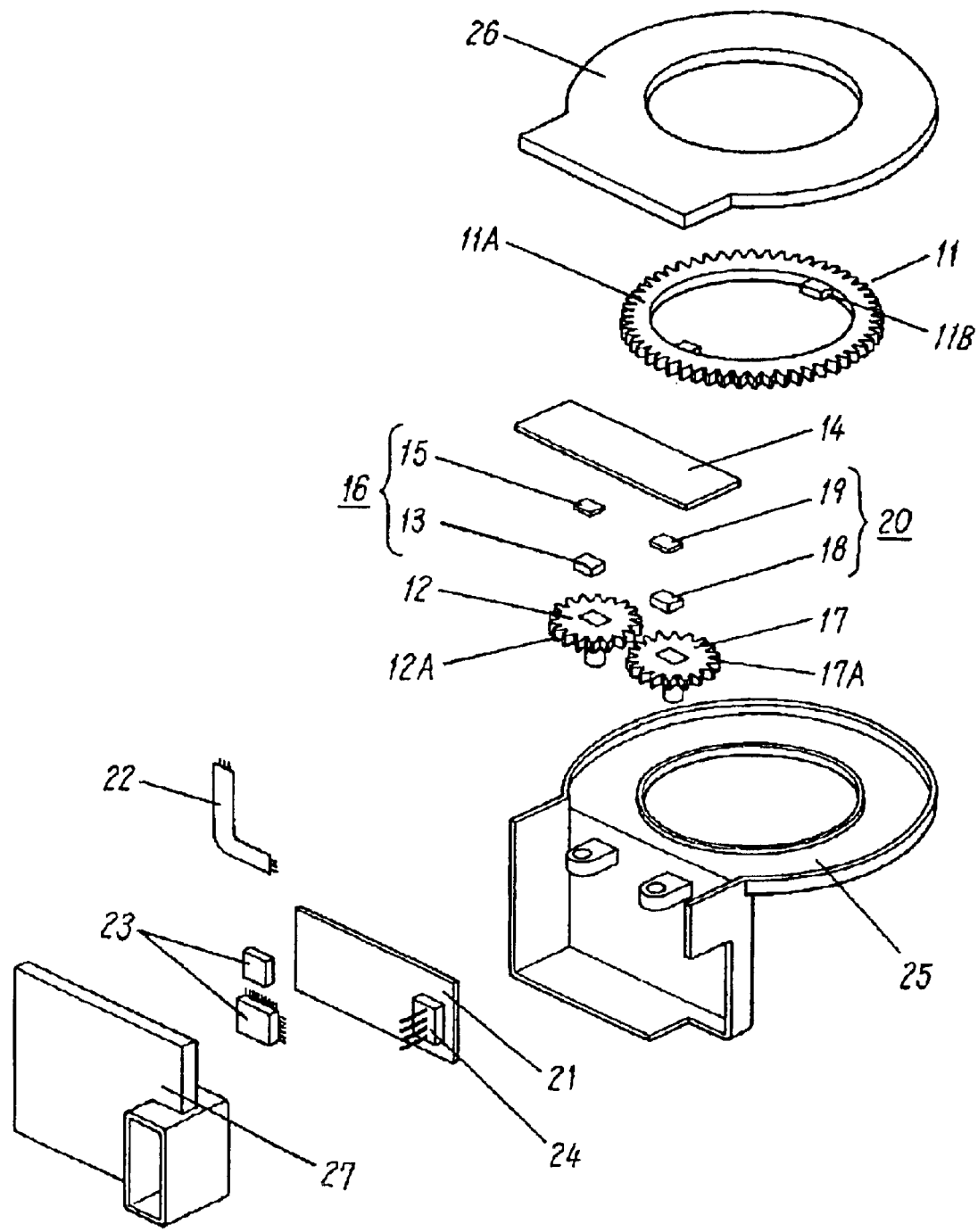
FIG. 2 is an exploded perspective view of the rotation angle detector in accordance with Embodiment 1.
Figure 3:
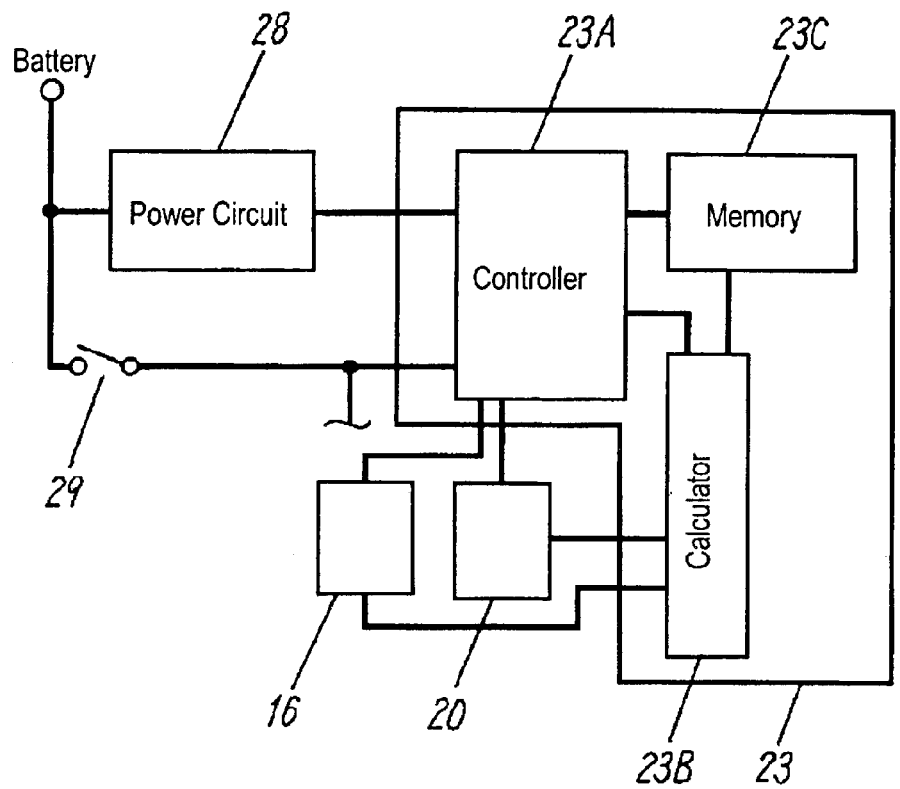
FIG. 3 is a block circuit diagram of the rotation angle detector in accordance with Embodiment 1.

FIG. 1 is a perspective view of an essential part of a rotation angle detector according to Exemplary Embodiment 1 of the present invention. FIG. 2 is an exploded perspective view of the detector. FIG. 3 is a circuit block diagram of the detector. Spur gear 11A provided on a rim of rotor 11, and fitting part 11B which fits to a shaft of a steering wheel (not illustrated) passing through rotor 11 is provided inside rotor 11. First detecting element 12 includes spur gear 12A on its rim, and spur gear 12A engages spur gear 11A on rotor 11. Magnet 13 is mounted at the center of first detecting element 12 preferably by insert molding. Wiring board 14 is provided on the top face of first detecting element 12 substantially in parallel to element 12, and has wiring patterns (not illustrated) formed on both faces of wiring board 14. Magnetic sensor 15, such as an anisotropic magnetoresistive (AMR) element, is provided on wiring board 14 and faces first detecting element 12. First detecting unit 16 is composed of magnet 13 and magnetic sensor 15 facing each other. Second detecting element 17 has spur gear 17A having the same number of teeth as first detecting element 12 on its rim. Spur gear 17A engages spur gear 11A. Magnet 18 is mounted at the center of second detecting element 17 preferably by insert molding. Magnetic sensor 19 is provided on wiring board 14 facing magnet 18. Magnetic sensor 19 and magnet 18 form second detecting unit 20. Wiring board 21 is connected to wiring board 14 with lead wire 22. Control unit 23 configured with an electronic component, such as a microcomputer, is connected to magnetic sensors 15 and 19, and is provided on wiring board 21. Control unit 23 is connected to an electronic circuit (not illustrated) in a vehicle with connector 24. Insulated resin case 25 and insulated resin covers 26 and 27 cover and position rotor 11, first detecting element 12, second detecting element 17, and wiring boards 14 and 21 at their predetermined positions, thus providing the rotation angle detector.

As shown in FIG. 3, first detecting unit including magnet 13 and magnetic sensor 15 and second detecting unit 20 including magnet 18 and magnetic sensor 19 are connected to control unit 23. Control unit 23 includes controller 23A, calculator 23B processing signals from first detecting unit 16 and second detecting unit 20, and memory 23C storing an angle calculated by the processing.

Control unit 23 is connected to power circuit 28 which converts a voltage of 12V of a car battery in to 5V and supplies it to control unit 23 and ignition (IG) switch 29 for switching power supply to electronic circuits in the vehicle body.

In the rotation angle detector having the above structure, rotor 11 rotates as the steering wheel rotates. Then, first detecting element 12 and second detecting element 17 including spur gears 12A and 17A engaged to spur gear 11A on the rim of rotor 11 also rotate, respectively.

Figure 4:
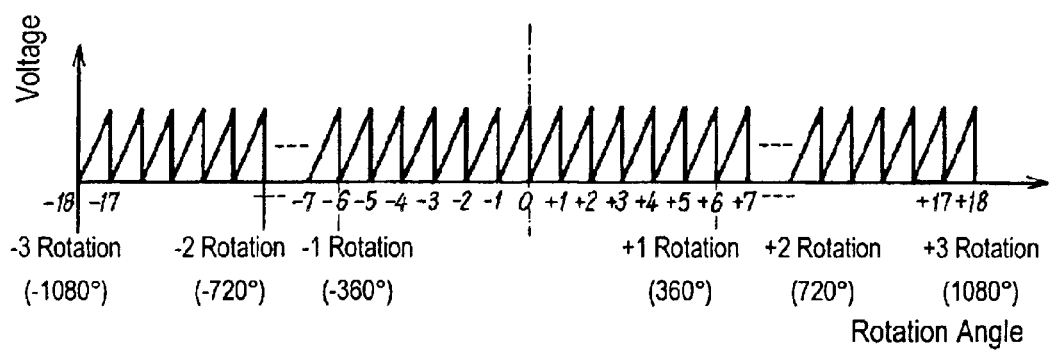
FIG. 4 shows a waveform of a voltage output from the rotation angle detector in accordance with Embodiment 1.

According to the rotation of first detecting element 12 and second detecting element 17, magnets 13 and 18 mounted at the centers thereof rotate. Magnetic sensors 15 and 19 detect changes of a magnetic field when magnets 13 and 18 rotate, and output periodical detection signals having a substantially-triangular waveforms gradually increasing and decreasing, as shown in FIG. 4.

For example, the number of teeth of each of first detecting element 12 and second detecting element 17 is set to ⅓ the number of teeth of rotor 11. In this case, magnetic sensors 15 and 19, which detect the intensity of magnetism, detect magnetic peaks every time rotors 12 and 17 rotate by 180°. First detecting element 12 and second detecting element 17 rotate three times while rotor 11 rotates once. Magnetic sensors 15 and 19 thus detect three magnetic peaks while first and second rotors 12 and 17 rotate once. Accordingly, each of magnetic sensors 15 and 19 outputs six peaks of the triangular waveform as a detection signal. In other words, six peaks of the triangular waveform are output when rotor 11 rotates once, i.e., by 360°. Each of magnetic sensors 15 and 19 outputs one peak of the triangular waveform to control unit 23 as a detection signal every time rotor 11 rotates by 60°.

Then, calculator 23B of control unit 23 counts the number of the peaks of the triangular waveforms output from magnetic sensors 15 and 19 so as to detect the rotation angle of rotor 11 approximately. The rotation angle of rotor 11 is then detected accurately based on a voltage of the triangular waveform.

Figure 5A:
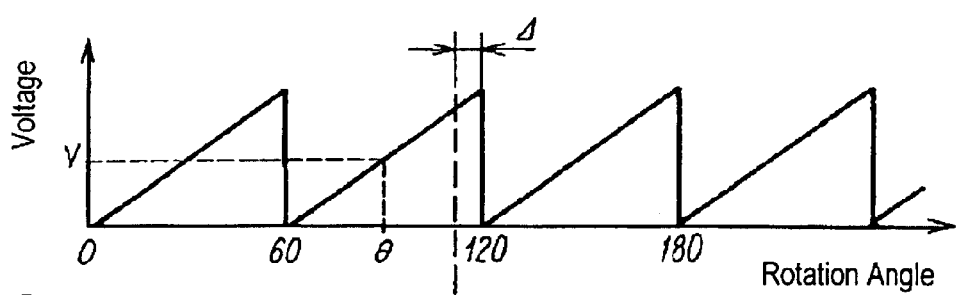
FIGS. 5A and 5B show waveforms of voltages output from the rotation angle detector in accordance with Embodiment 1.

FIG. 5A shows a waveform of a voltage output from magnetic sensor 15. Rotation angle θ corresponds to the second peak counted from 0°, a reference, of the triangular waveform of the detection signal, which is the reference. Calculator 23B thus detects that angle θ ranges between 60° and 120°. Then, voltage V enables an accurate rotation angle of rotor 11, such as 90°, to be detected.

Calculator 23B detects the direction of the rotation of the steering wheel by detecting whether the voltage subsequently increases or decreases.

Figure 5B:
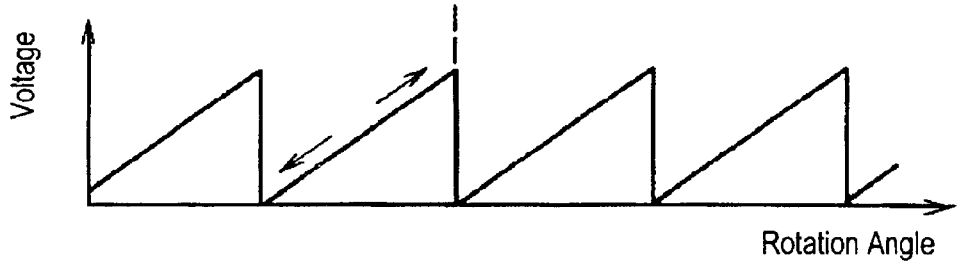

FIG. 5B shows a waveform of a voltage output from magnetic sensor 19. Magnetic sensors 15 and 19 are mounted so that there is no phase difference in the waveforms of the voltages when the rotation angle is 0°. If first detecting element 12 or second detecting element 17 is damaged or worn, the voltages have phase difference Δ between the waveforms, as shown in FIGS. 5A and 5B.

If one of the spur gears removes from rotor 11, one of the magnetic sensors outputs a detection signal changing in response to the rotation of the steering wheel, but the other magnetic sensor detecting the rotation of the removing gear continues to output a constant voltage.

Control unit 23 detects the detection signals from first detecting unit 16 and second detecting unit 20, and compares the signals with predetermined values, such as voltages and times stored previously in memory 23C so as to determine whether detecting elements 12 and 17 are rotating properly.

More specifically, if the same waveform is output from first detecting unit 16 and second detecting unit 20 and if the absolute value of phase difference Δ between the waveforms does not exceed a predetermined value, control unit 23 determines that first detecting element 12 and second detecting element 17 rotates properly. The rotation angle of rotor 11 is then detected upon the detection signal from either of the detecting elements based on the number of peaks of the triangular waveform and the voltage.

If one of the detecting units continuously outputs a constant voltage while the other detecting unit outputs a changing voltage, or if the absolute value of phase difference Δ exceeds the predetermined value, control unit 23 determines that a failure occurs with the rotation of detecting element 12 or 17. Controller 23A then outputs a predetermined signal to the electronic circuit (not illustrated) in the vehicle.

Upon receiving this signal, the electronic circuit in the vehicle notifies a driver of an error in detecting a rotation angle of the steering wheel through, e.g., blinking a lamp or making a beep.

According to the present embodiment, as described above, control unit 23 detects the detection signals output from first detecting unit 16 and second detecting unit 20, and detects the rotation angle of rotor 11 based on the detection signal from either of the detecting elements when the phase difference between the detection signals ranges within a predetermined range. This provides a rotation angle detector with a simple structure that accurately detect the rotation angle.

First detecting unit 16 including magnet 13 and magnetic sensor 15 and second detecting unit 20 including magnet 18 and magnetic sensor 19 allows the angle detector to detect the angle by a reliable non-contact detection. In addition, this configuration allows the angle detector to be manufactured inexpensively with a simple structure.

In order to determine only that one of detecting elements removes from rotor 11 and does not rotating, one of first detecting unit 16 and second detecting unit 20 may employ a Hall element for detecting whether or not a magnetic field exists, not the intensity of the magnetic field. Although such rotation angle detector cannot detect small damage or wear of gears on detecting elements 12 and 17, the detector can be more inexpensive by employing the Hall element for detecting only the rotation of one of the detecting elements.

According to Embodiment 1, magnetic sensors 15 and 19 are mounted on wiring board 4 so that phase difference Δ between the waveforms of the voltages output from magnetic sensors 15 and 19 is zero when the rotation angle of rotor 11 is 0°. Magnetic sensors 15 and 19 may be arranged so that there is an initial phase difference $\Delta_0$ between the waveforms output from detecting elements 15 and 19 when the rotation angle of rotor 11 is 0°. In this case, difference $(\Delta_1 - \Delta_0)$ between detected phase difference $\Delta_1$ and initial phase difference $\Delta_0$ is used as phase difference Δ.

(Exemplary Embodiment 2)

A rotation angle detector according to Exemplary Embodiment 2 will be described. The same elements as those of Embodiment 1 are denoted by the same reference numerals and are not described in detail.

Figure 6:
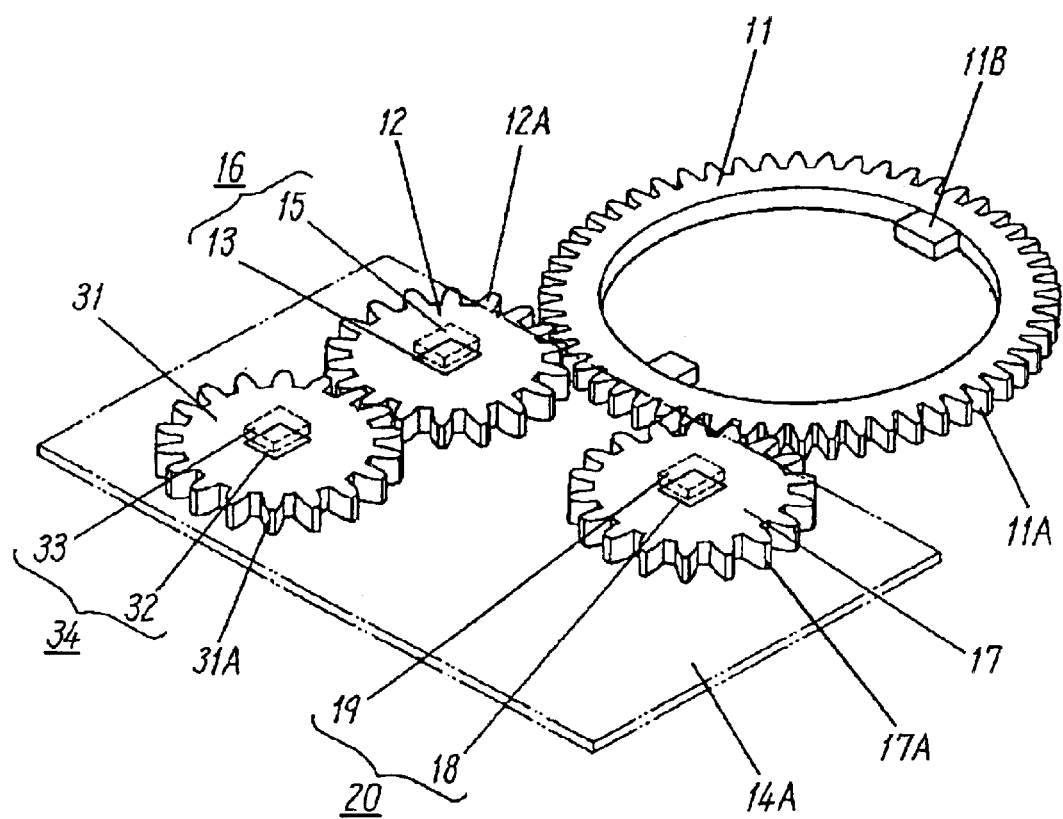
FIG. 6 is a perspective view of an essential part of a rotation angle detector in accordance with Exemplary Embodiment 2 of the invention.

FIG. 6 is a perspective view of an essential part of the rotation angle detector of Embodiment 2 of the present invention. The detector, similarly to Embodiment 1, includes spur gear 12A on a rim of first detecting element 12, and spur gear 17 having the same number of teeth as spur gear 12A on a rim of second detecting element 17. Spur gears 12A and 17A engage spur gear 11A of rotor 11. Magnets 13 and 18 are mounted at the centers of first detecting element 12 and second detecting element and 17 preferably by insert molding, respectively. Wiring board 14A is provided on a top face of detecting elements 12 and 17 substantially in parallel to elements 12 and 17. Magnetic sensors 15 and 19 are mounted on a face of wiring board 14A facing detecting elements 12 and 17, respectively, thus composing first detecting unit 16 and second detecting unit 20, respectively.

In the rotation angle detector of Embodiment 2, spur gear 31A of third detecting element 31 is engaged to spur gear 12A of first detecting element 12. Spur gear 31A has a different number of teeth than spur gear 12A. Magnet 32 is mounted at the center of third detecting element 31 preferably by insert molding. Magnetic sensor 33 mounted on wiring board 14A faces magnet 32. Magnetic sensor 33 and magnet 32 thus form third detecting unit 34. Magnetic sensors 15, 19, and 33 are connected to control unit 23 composed of an electronic component, such as a microcomputer, thus providing the rotation angle detector.

In the above structure, rotor 11 rotates according to a rotation of a shaft of a steering wheel (not illustrated) fitted to fitting part 11B inside rotor 11. First and second detecting elements 12 and 17 having spur gears 12A and 17A engage spur gear 11A on the rim of rotor 11 rotate accordingly. Third detecting element 31 having spur gear 31A engaged spur gear 12A rotates accordingly.

Control unit 23, similarly to Embodiment 1 detects detection signals from first detecting unit 16 and second detecting unit 20 to determine whether or not one of detecting elements removes from rotor 11, is damaged, or worn for detecting that each detecting element rotates properly.

Then, the rotation angle detector detects a rotation angle of the rotor by a method different from that of Embodiment 1. According to Embodiment 1, the rotation angle of rotor 11 is detected based on a detection signal from either first detecting unit 16 or second detecting unit 20. According to Embodiment 2, however, detection signals from first detecting unit 16 and third detecting unit 34 are used for detecting the rotation angle. When first detecting element 12 and third detecting element 31 rotate according to the rotation of rotor 11, magnets 13 and 32 mounted at the centers of the detecting elements rotate accordingly. Magnetic sensors 15 and 33 then detect changes of magnetic fields from the magnets, and output detection signals to control unit 23.

Figure 7A:
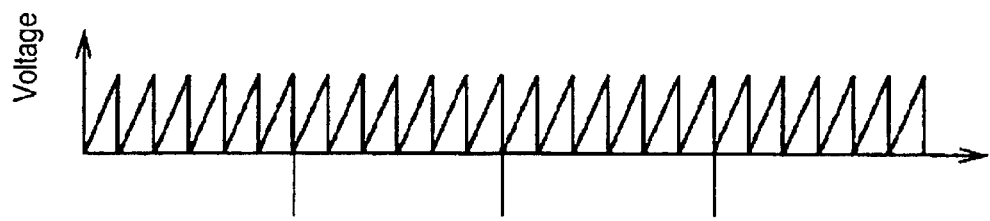
FIGS. 7A and 7B show waveforms of voltages output from the rotation angle detector in accordance with Embodiment 2.
Figure 7B:
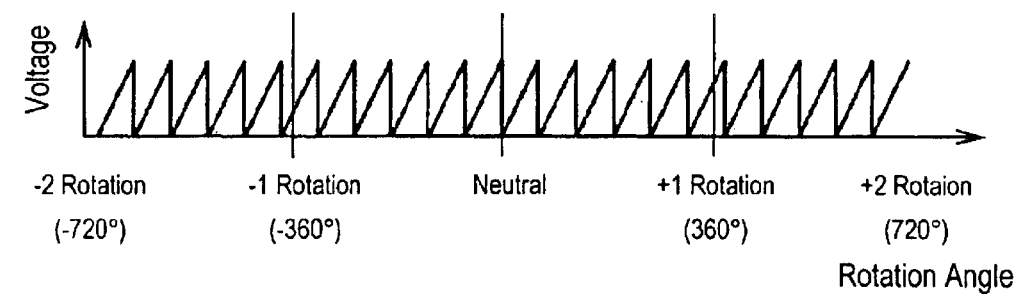

Since the numbers of teeth of the gears on first detecting element 12 and third detecting element 31 are different, triangular waveforms have shapes of gradually increasing and decreasing are different from each other, as shown in FIGS. 7A and 7B. Continuous periodical detection signals having a phase difference between the signals are thus output.

FIGS. 7A and 7B show waveforms of voltages output from first detecting unit 16 and third detecting unit 34. As shown in FIG. 7A, first detecting unit 16 outputs six peaks of the triangular waveform by one rotation of rotor 11, i.e., by 360°. In other words, one peak of the triangular waveform is output to control unit 23 as the detection signal every time rotor 11 rotates by 60°. Third detecting unit 34, as shown in FIG. 7B, outputs the detection signal with a phase difference which has a waveform different from that shown in FIG. 7A.

Figure 8A:
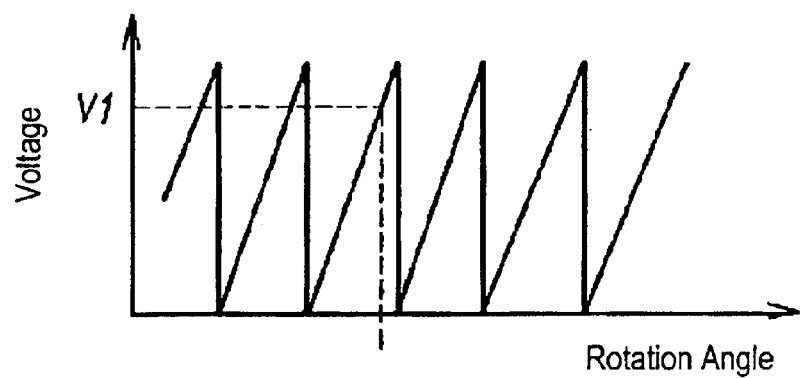
FIGS. 8A and 8B show waveforms of voltages output from the rotation angle detector in accordance with Embodiment 2.
Figure 8B:
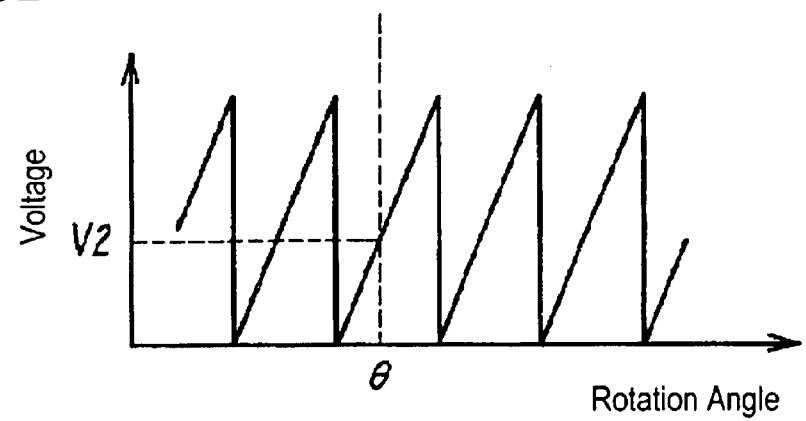

FIG. 8A shows the signal from first detecting unit 16 with phase difference, and FIG. 8B shows the detection signal from third unit 34. As shown in FIGS. 8A and 8B, control unit 23 detects voltage V1 from first detecting unit 16 and detects voltage V2 from third detecting unit 34 having a phase difference. Rotation angle $\theta$ of rotor 11 is detected by processing the voltages and the number of teeth of each of spur gears 12A and 31A.

The rotation angle detector of Embodiment 2 requires more complicated processing by control unit 23 than the detector of Embodiment 1 which detects the rotation angle of rotor 11 by the detection signal from one detecting element. However, the detector of Embodiment 2 detects the rotation angle more accurately due to two detection signals from first detecting element 12 and third detecting element 31 which are engaged but have the numbers of teeth different from each other.

Figure 9:
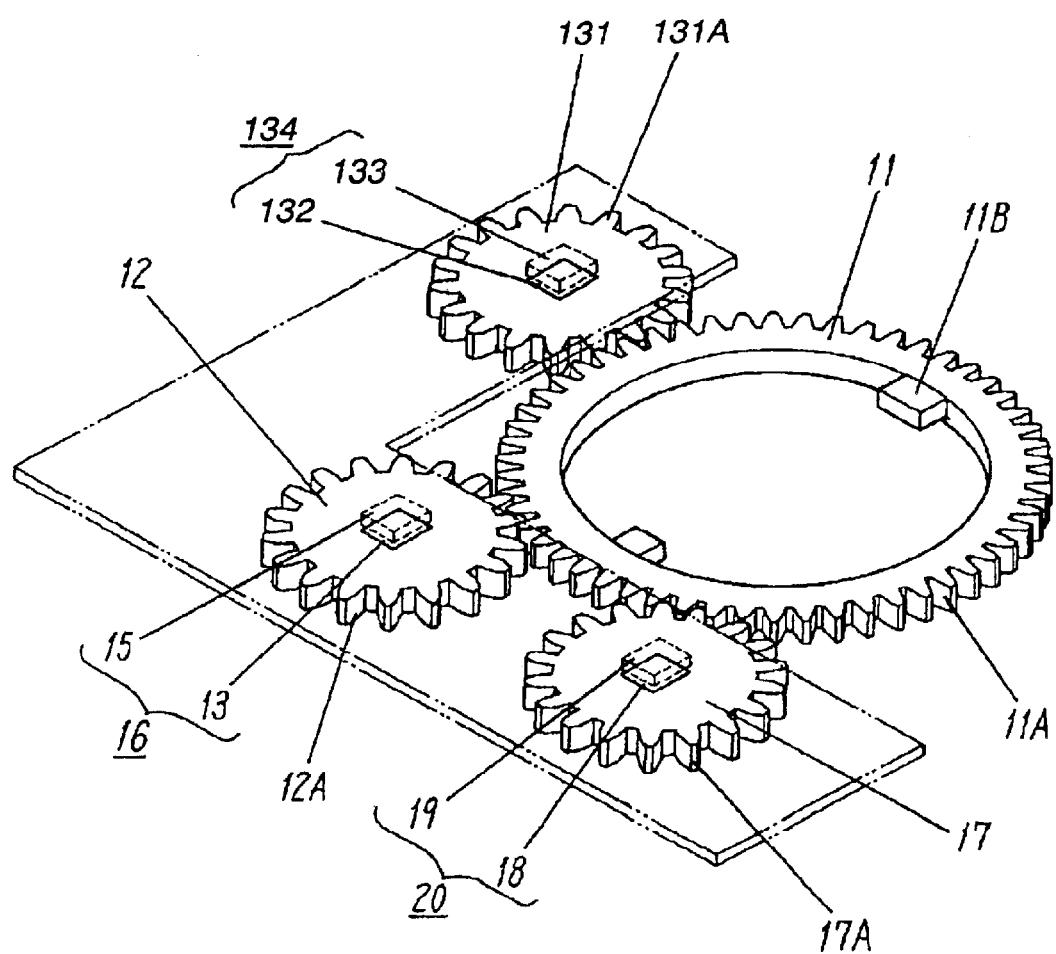
FIG. 9 is a perspective view of an essential part of another rotation angle detector in accordance with Embodiment 2.

FIG. 9 is a perspective view of an essential part of another rotation angle detector according to Embodiment 2. In the above description, third detecting element 131 is engaged to first detecting element 12 engaging rotor 11. However, third detecting element 131 may be directly engaged to rotor 11, as shown in FIG. 9. The detecting element detects the rotation angle of rotor 11 based on detection signals from third detecting unit 134 and one of first detecting unit 16 and second detecting unit 20.

Figure 10:
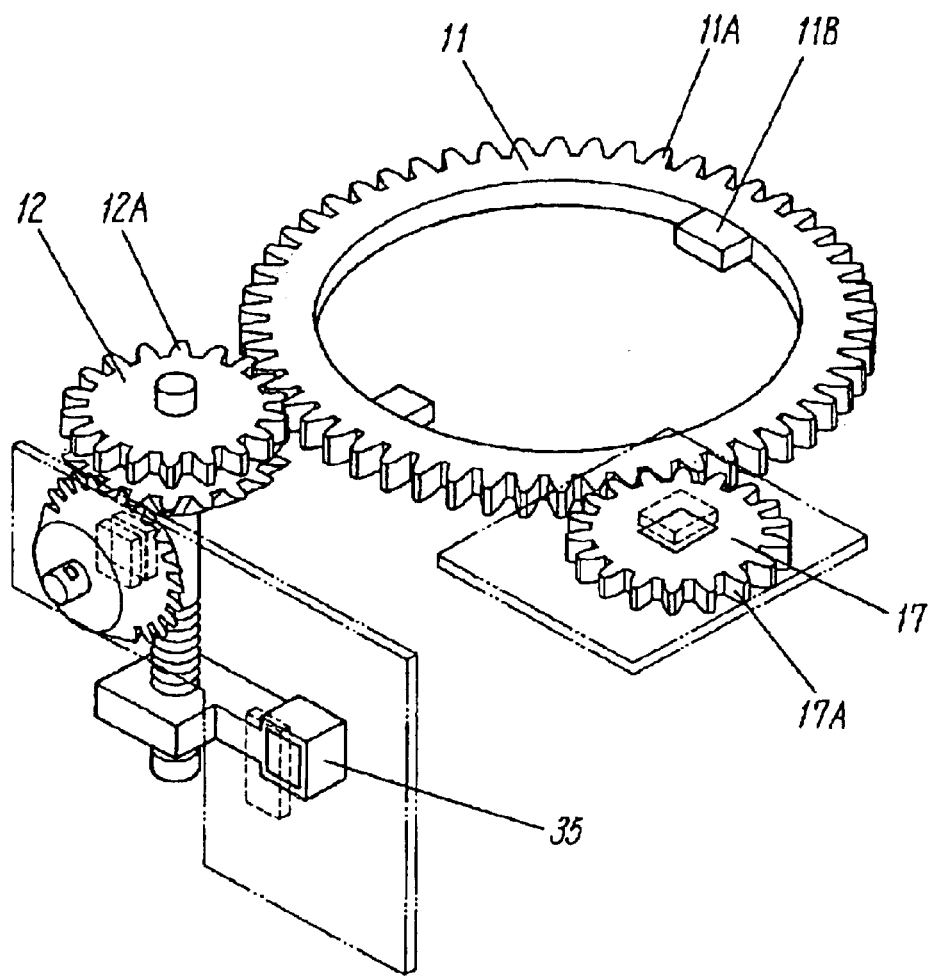
FIG. 10 is a perspective view of an essential part of still another rotation angle detector in accordance with Embodiment 2.
Figure 11:
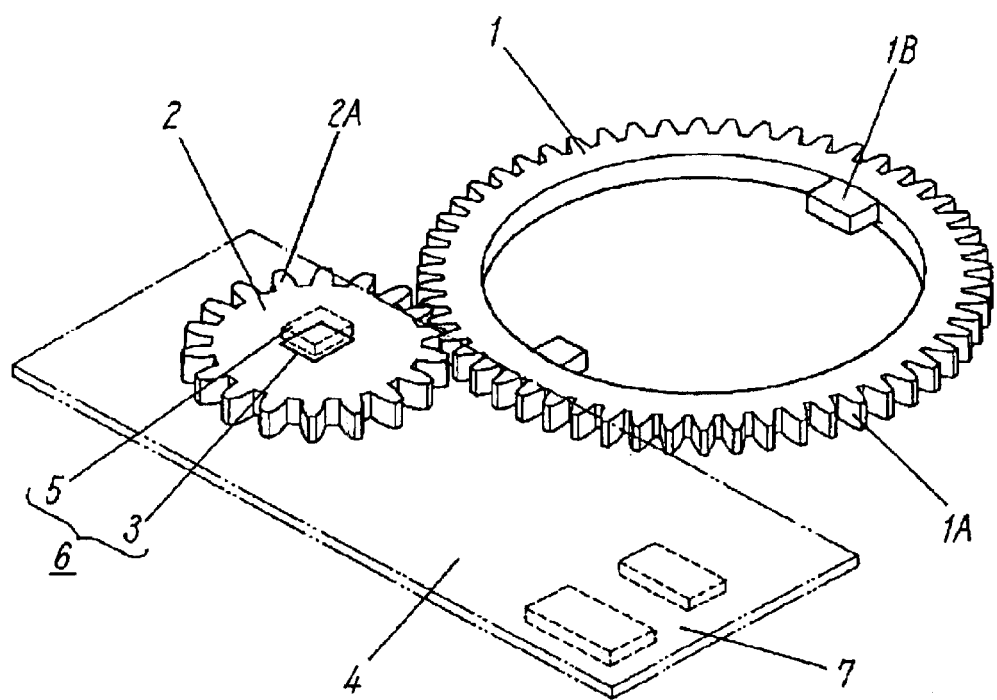
FIG. 11 is a perspective view of an essential part of a conventional rotation angle detector.

FIG. 10 is a perspective view of an essential part of still another rotation angle detector according to Embodiment 2. As shown in FIG. 10, a speed reduction mechanism, such as a bevel gear or worm gear, may be provided to first detecting element 12, and third detecting element 31 may be engaged to the mechanism. Alternatively, a magnetic sensor may detect a movement of a magnet mounted on movable member 35 movable linearly with the worm gear, thus allowing the angle detector to detect the rotation angle similarly to this embodiment.

According to Embodiment 2, magnetic sensors 15 and 33 are mounted on wiring board 4 so that phase difference $\Delta$ of the waveforms of the voltages output from magnetic sensors 15 and 133 is zero when the rotation angle of rotor 11 is 0°. Magnetic sensors 15 and 133 may be arranged so that there is an initial phase difference $\Delta_0$ between the waveforms of the voltages output from sensors 15 and 33 when the rotation angle of rotor 11 is 0°. In this case, difference $\Delta_2-\Delta_0$ between detected phase difference $\Delta_2$ and initial phase difference $\Delta_0$ is used as phase difference $\Delta$.

What is claimed is:

1. A rotation angle detector comprising:
   a rotor;
   first and second detecting elements which rotate according to a rotation of said rotor;
   first and second detecting units for detecting rotations of said first and second detecting elements, respectively; and
   a control unit for detecting a rotation angle of said rotor when a difference between first and second signals output from said first and second detecting units ranges within a predetermined range, and for determining, based on said difference between said first and second signals, whether or not at least one of said first and second elements rotates within a predetermined tolerance.

2. A rotation angle detector comprising:
   a rotor;
   first and second detecting elements which rotate according to a rotation of said rotor;
   first and second detecting units for detecting rotations of said first and second detecting elements, respectively;
   a third detecting element which rotates according to the rotation of said rotor;

a third detecting unit for detecting a rotation of said third detecting element; and a control unit operable to detect said rotation angle of said rotor based on a first signal output from said first detecting unit and a third signal output from said third detecting unit when a difference between said first signal and a second signal output from said second detecting unit ranges within a predetermined range.

3. A rotation angle detector comprising:

a rotor;

first and second detecting elements which rotate according to a rotation of said rotor;

first and second detecting units for detecting rotations of said first and second detecting elements, respectively; and a third detecting element which moves according to the rotation of said rotor; and a third detecting unit for detecting a movement of said third detecting element; and a control unit operable to detect said rotation angle of said rotor based on a first signal output from said first detecting unit and a third signal output from said third detecting unit when a difference between said first signal and a second signal output from said second detecting unit ranges within a predetermined range.

4. The rotation angle detector of claim 1, wherein said first detecting unit includes a first magnet and a first magnetic sensor which detects a magnetic field from said first magnet.

5. The rotation angle detector of claim 4, wherein said second detecting unit includes a second magnet and a second magnetic sensor which detects a magnetic field from said second magnet.

6. The rotation angle detector of claim 4, wherein said second detecting unit includes a second magnet and a Hall element which detects a magnetic field of said second magnet.

7. The rotation angle detector of claim 1, wherein said control unit determines that said at least one of said first and second detecting elements does not rotate properly if said difference between said first and second signals exceeds a predetermined value.

8. A rotation angle detector comprising:

a rotor;

first and second detecting elements which rotate according to a rotation of said rotor;

first and second detecting units for detecting rotations of said first and second detecting elements, respectively; and a control unit for detecting a rotation angle of said rotor based on a first signal only when a difference between said first and second signals output from said first and second detecting units ranges within a predetermined range.

9. A rotation angle detector comprising:

a rotor;

first and second detecting elements which rotate according to a rotation of said rotor;

first and second detecting units for detecting rotations of said first and second detecting elements, respectively;

a third detecting element which rotates according to the rotation of said first detecting element;

a third detecting unit for detecting a rotation of said third detecting element; and a control unit operable to detect said rotation angle of said rotor based on a first signal output from said first detecting unit and a third signal output from said third detecting unit when a difference between said first signal and a second signal output from said second detecting unit ranges within a predetermined range.

* * * * *